United States Patent
Knigge et al.

(10) Patent No.: US 7,586,711 B2
(45) Date of Patent: Sep. 8, 2009

(54) MAGNETIC PERFORMANCE OF A MAGNETIC TRANSDUCER OPERATING WITHIN A HARD DISK DRIVE

(75) Inventors: Bernhard E. Knigge, San Jose, CA (US); Ullal V. Nayak, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 12/001,250

(22) Filed: Dec. 10, 2007

(65) Prior Publication Data

US 2009/0147404 A1    Jun. 11, 2009

(51) Int. Cl.
*G11B 21/02*    (2006.01)
(52) U.S. Cl. .......................................... 360/75
(58) Field of Classification Search ................. None
See application file for complete search history.

(56) References Cited

U.S. PATENT DOCUMENTS

| | | | |
|---|---|---|---|
| 6,055,128 A | 4/2000 | Dorius et al. | |
| 6,144,528 A | 11/2000 | Anaya-Dufresne et al. | |
| 6,510,027 B1 | 1/2003 | Chapin et al. | |
| 6,587,308 B2 | 7/2003 | Sannino et al. | |
| 6,603,639 B1 | 8/2003 | Polycarpou et al. | |
| 6,647,612 B1 | 11/2003 | Boutaghou et al. | |
| 6,710,976 B2 | 3/2004 | Chapin et al. | |
| 7,009,800 B2 * | 3/2006 | Yang | 360/75 |
| 7,324,299 B1 * | 1/2008 | Schreck et al. | 360/75 |
| 2002/0191340 A1 | 12/2002 | Chapin et al. | |
| 2004/0052001 A1 | 3/2004 | Crone et al. | |
| 2006/0066978 A1 * | 3/2006 | Takagi et al. | 360/75 |
| 2008/0043355 A1 * | 2/2008 | Ota | 360/31 |
| 2008/0247073 A1 * | 10/2008 | Park | 360/59 |

OTHER PUBLICATIONS

Peng, et al., "Effect of van der Waals Force on Air-Bearing Flying Characteristics at Ultra-Low Fly Height", *IEEE Transactions on Magnetics*, vol. 42, No. 10, Oct. 2006,2483-2485.
Li, et al., "Effects of Intermolecular Forces on Deep Sub-10 nm Spaced Sliders", *IEEE Transactions on Magnetics*, vol. 38, No. 5,Sep. 2002,2141-2143.
Matsumoto, et al., "Design and Performance of Novel Air Bearing Slider", *IEEE Transactions on Magnetics*, vol. 30, No. 6, Nov. 1994,4158-4160.
Chhabra, et al., "Air Bearing Design Considerations for Constant Fly Height Applications", *IEEE Transactions on Magnetics*, vol. 30, No. 2, Mar. 1994,417-423.
Liu, et al., "Air-Bearing Design Towards Highly Stable Head-Disk Interface at Ultralow Flying Height", *IEEE Transactions on Magnetics*, vol. 43, No. 2, Feb. 2007,715-720.

* cited by examiner

*Primary Examiner*—Andrew L Sniezek

(57) ABSTRACT

A method for improving the magnetic performance of at least one magnetic transducer operating within a hard disk drive. The method comprises flying the magnetic transducer at a distance of separation from a magnetic recording media. The magnetic transducer is coupled with a highly damped air bearing surface and a fly height control device. At least one operating parameter of the hard disk drive is measured. The magnetic transducer is moved with the fly height control device into contact with the magnetic recording media, in accordance with at least one operating parameter of the hard disk drive. The magnetic transducer is operated while the magnetic transducer is in contact with the magnetic recording media, thereby improving the magnetic performance of the magnetic transducer.

20 Claims, 6 Drawing Sheets

MAGNETIC PERFORMANCE OF A MAGNETIC TRANSDUCER OPERATING WITHIN A HARD DISK DRIVE

TECHNICAL FIELD

This invention relates generally to the field of direct access storage devices and in particular to transitioning from flying a magnetic transducer adjacent to a magnetic recording media to contacting the magnetic recording media with the magnetic transducer.

BACKGROUND

Direct access storage devices (DASD) have become part of every day life, and as such, expectations and demands continually increase for greater speed for manipulating data and for holding larger amounts of data. To meet these demands for increased performance, the mechanical assembly in a DASD device, specifically the Hard Disk Drive (HDD) has undergone many changes.

The amount of data that can be stored on a disk is governed by many well known physical principles. There exists a direct correlation between the distance that a magnetic transducer is spaced from the magnetic recording media and the amount of data that can be stored on the disk. This distance is typically known as "fly height." This correlation is expressed by the Wallace equation, which is well known and understood in the art of magnetic recording. The Wallace equation teaches in part that as fly height increases, the amount of data that can be stored on the magnetic recording media decreases due to a decrease in signal amplitude of the written and read data on the magnetic recording media. Conversely, as fly height decreases, the amount of data that can be stored on the magnetic recording media increases due to an increase in signal amplitude of the written and read data on the magnetic recording media. The Wallace equation presents that at the extreme condition of the magnetic transducer sliding in contact with the magnetic recording media, the maximum amount of data and maximum amplitude of written and read data for a given magnetic transducer and magnetic recording media combination is achieved. Mechanical wear of the magnetic transducer and magnetic recording media is of concern for sliding in contact.

SUMMARY OF THE INVENTION

Various embodiments of the present invention are described herein. A method for improving the magnetic performance of at least one magnetic transducer operating within a hard disk drive. The method comprises flying the magnetic transducer at a distance of separation from a magnetic recording media. The magnetic transducer is coupled with a highly damped air bearing surface and a fly height control device. At least one operating parameter of the hard disk drive is measured. The magnetic transducer is moved with the fly height control device into contact with the magnetic recording media, in accordance with at least one operating parameter of the hard disk drive. The magnetic transducer is operated while the magnetic transducer is in contact with the magnetic recording media, thereby improving the magnetic performance of the magnetic transducer.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that embodiments of the present invention may be practiced without these specific details. In other instances, well known methods, procedures, and components have not been described in detail as not to unnecessarily obscure aspects of the present invention.

The discussion will begin with a brief overview of a hard disk drive (HDD) which comprises a head gimbal assembly having magnetic transducer coupled with a fly height control device whereby embodiments of the present invention enable improved magnetic performance of the magnetic transducer coupled with a highly damped air bearing surface. The discussion will then focus on embodiments of the present invention by which improved performance of the magnetic transducer is achieved. The implementation of embodiments of the present invention will then be discussed.

Overview

Figure 1:
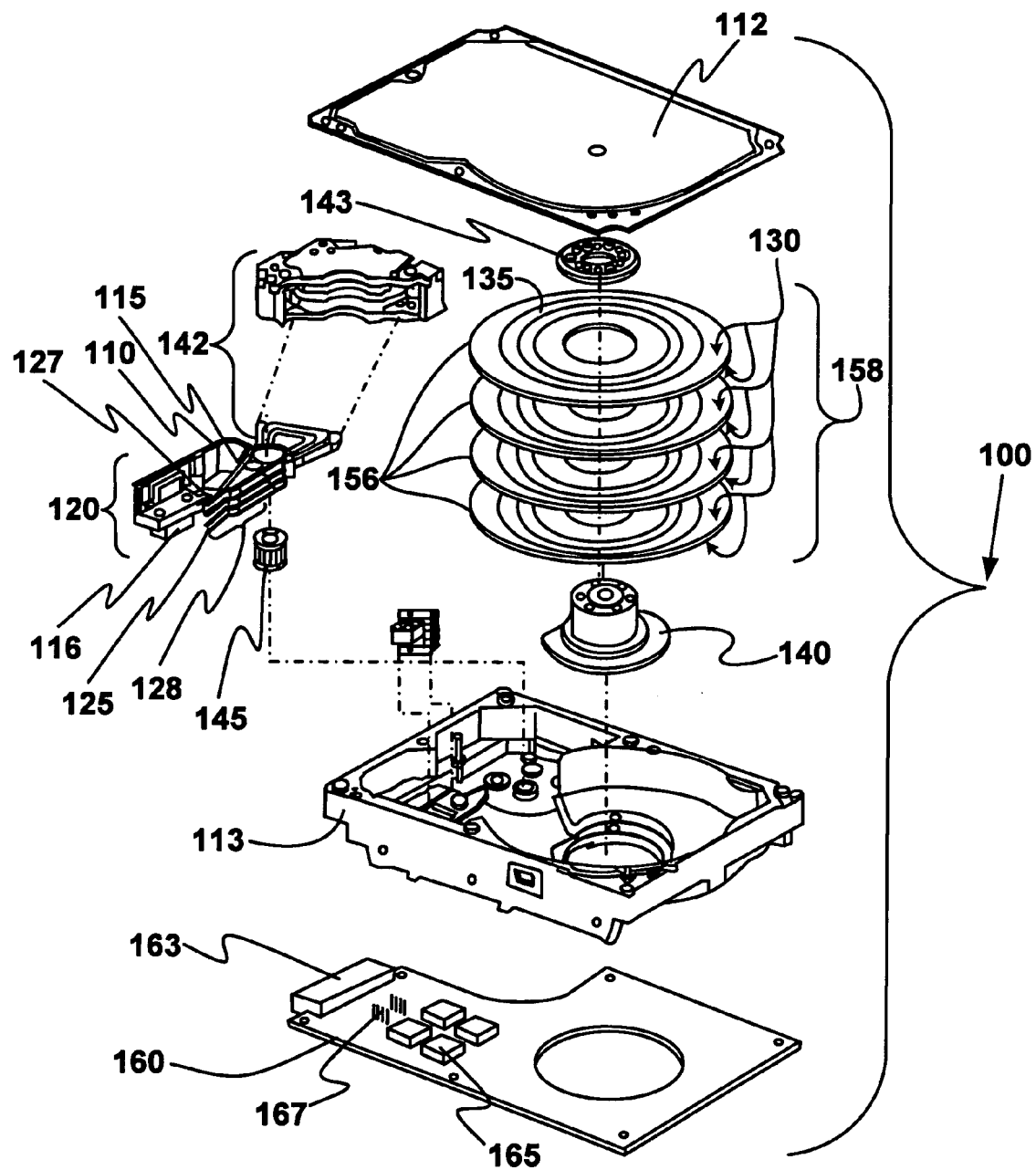
FIG. 1 is an isometric blow-apart of an HDD in accordance with one embodiment of the present invention.

With reference to FIG. 1, an isometric blow-apart of HDD 100 is presented in accordance with an embodiment of this invention. Base casting 113 provides coupling points for components and sub-assemblies such as disk stack 158, voice coil motor (VCM) 142, and head stack assembly (HSA) 120. Disk stack 158 is coupled with base casting 113 by means of motor-hub assembly 140 and disk clamp 143. Motor-hub assembly 140 will have at least one disk 156 coupled with it such that disk 156 can rotate about an axis common to motor-hub assembly 140 and the center of disk 156. Disk 156 has at least one disk surface 130 upon which reside data tracks 135. HSA 120, sometimes referred to as an actuator assembly or carriage, comprises suspension 127, which suspends hard disk drive slider 125 next to disk surface 130, and HSA connector 116. Suspension 127 and hard disk drive slider 125 comprise head gimbal assembly (HGA) 128. Flex cable 110, which is part of HSA 120, conveys data between HSA connector 116 and arm electronics (A/E) module 115. HSA connector 116 also conveys control data between printed circuit board (PCB) 160 and VCM 142.

HSA 120 is coupled pivotally with base casting 113 by means of pivot bearing 145, such that VCM 142 can move HGA 128 with slider 125 arcuately across disk surface 130, accessing data tracks 135. Upon assembly of HSA 120, disk stack 158, VCM 142, and other components with base casting 113, cover 112 is coupled with base casting 113 to enclose these components and sub-assemblies into HDD 100.

Once cover 112 is coupled with base casting 113, PCB 160 is coupled to base casting 113. PCB 160 comprises at least one electrical component 165 which in general performs the electrical tasks of HDD 100, such as servo control of VCM 142, status check of HDD 100 before writing data, and power control for sub-assemblies within HDD 100. HGA 128 is electrically coupled with PCB 160 via HSA connector 116 and an appropriately mating connection 167 on PCB 160. Electrical coupling of HDD 100 to a host system in which HDD 100 operates is enabled in part through PCB connector 163, coupled to PCB 160.

Figure 2:
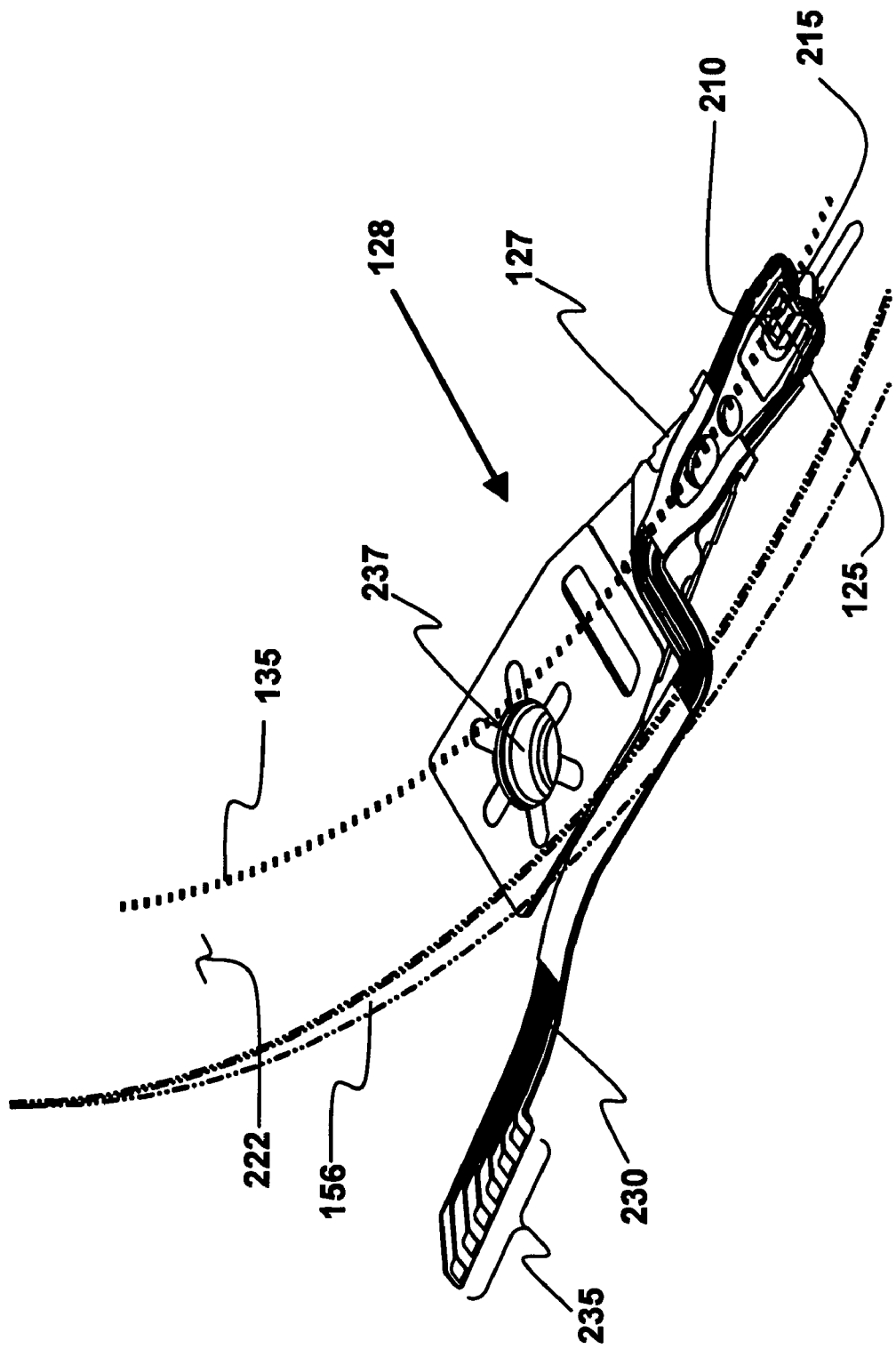
FIG. 2 is an isometric of head gimbal assembly (HGA) and disk in accordance with one embodiment of the present invention.

With reference to FIG. 2, an isometric of HGA 128 and disk 156 is presented in accordance with one embodiment of the present invention. Disk 156 is presented with phantom lines so that magnetic recording data track 135, magnetic recording media 222, and features of HGA 128 that face disk 156 are visible. Magnetic recording data track 135 is written onto magnetic recording media 222. Commands from A/E module 115 for writing data track 135 are transmitted to magnetic transducer 215 via conductors 230. Conductors 230 also transmit data read by magnetic transducer 215 from data track 135 via conductors 230 to A/E module 115.

Magnetic transducer 215 is coupled with slider 125 such that magnetic transducer 215 follows nearly every motion of slider 125. Magnetic transducer 215 is separated from magnetic recording media 222 and magnetic recording data track 135 by balanced forces that are well known in the art. The separation of magnetic transducer 215 to magnetic recording data track 135 and magnetic recording media is known as fly height.

Historically, fly height of a magnetic transducer has been controlled through the design of the slider, upon which the magnetic transducer is coupled. Slider 125 comprises a surface known as an ABS (air bearing surface) 210 which in operation faces magnetic recording media 222 of disk 156. ABS 210 is patterned and configured such that as disk 156 (a section of which is shown with phantom lines in FIG. 2) spins adjacent to ABS 210, a film of air is created which provides spacing and support for slider 125 and magnetic transducer 215 away from magnetic recording media 222 of spinning disk 156. ABS 210 is designed using well understood principles of aerodynamics and fluid flow.

The fly height, at which magnetic transducer 215 flies is determined primarily by ABS 210 of slider 125. It is appreciated that other parameters of HDD 100 in which HGA 128 operates, determine the magnetic performance of magnetic transducer 215 as well as the fly height of magnetic transducer 215. Many of these parameters occur randomly and are beyond the control of the ABS, magnetic transducer, and HDD designers. Examples of these factors are: contamination, mechanical shock, atmospheric pressure, magnetic material instability, and temperature.

There has been a long felt need in the HDD art to compensate for these factors and improve performance of a magnetic transducer that has had its performance impacted by one or more of these factors.

Wallace spacing equation, which is well known to one of ordinary skill in the art, teaches in part the effects of fly height on reading and writing data onto a magnetic recording media. The closer a magnetic transducer flies to the magnetic recording media, the better the resolution of data written on and read from the magnetic recording media. The lower limit of spacing between the magnetic transducer and the magnetic recording media is to have no space whereby the magnetic transducer contacts the magnetic recording media.

Contacting magnetic recording media 222 with the magnetic transducer 215 during the operation of reading data track 135 and/or writing data track 135 will theoretically optimize magnetic transducer 215 for a given set of parameters, such as atmospheric pressure, magnetic material characteristics, and temperature. Contact recording may present advantages for magnetic performance, but typically causes problems for mechanical performance. Examples of such mechanical problems are wear of magnetic transducer 215, wear of magnetic recording media 222, debris generation, ABS contamination, and the like.

The mechanical interaction of magnetic transducer 215 with magnetic recording media 222 can degrade the magnetic performance of magnetic transducer 215. The theoretical advantages of reading and writing with magnetic transducer 215 in contact with magnetic recording media 222 assumes that there is smooth contact with out oscillations and bouncing of magnetic transducer 215. Typically, as magnetic transducer 215 makes contact with magnetic recording media 222, magnetic transducer 215 will vibrate and bounce, causing excursions away from magnetic recording media 222. It is more common in the art of magnetic recording to fly magnetic transducer 215 close to magnetic recording media 222 without contacting magnetic recording media 222, such that vibration and bounce of magnetic transducer 215 can be avoided during reading and writing of data track 135.

There exists several devices for fly height control that are well known in the art for bring magnetic transducer 215 into contact or near contact with magnetic recording media 222. Some examples of fly height control devices are: a PZT coupled with a suspension to deflect the suspension and urge the magnetic transducer closer to or farther from the magnetic recording media; a shape memory alloy, also known as SMA and NITINOL, coupled with a suspension to deflect the suspension and urge the magnetic transducer closer to or farther from the magnetic recording media; a PZT coupled with a slider to deflect the slider and urge the magnetic transducer closer to or farther from the magnetic recording media; and a thermal fly height control (TFC) coupled with a magnetic transducer to urge the magnetic transducer closer to the magnetic recording media. This list of examples is not intended to be an exhaustive list of fly height control devices. It is presented to demonstrate the existence of several fly height control devices known in the art.

Physical Description

Figure 3:
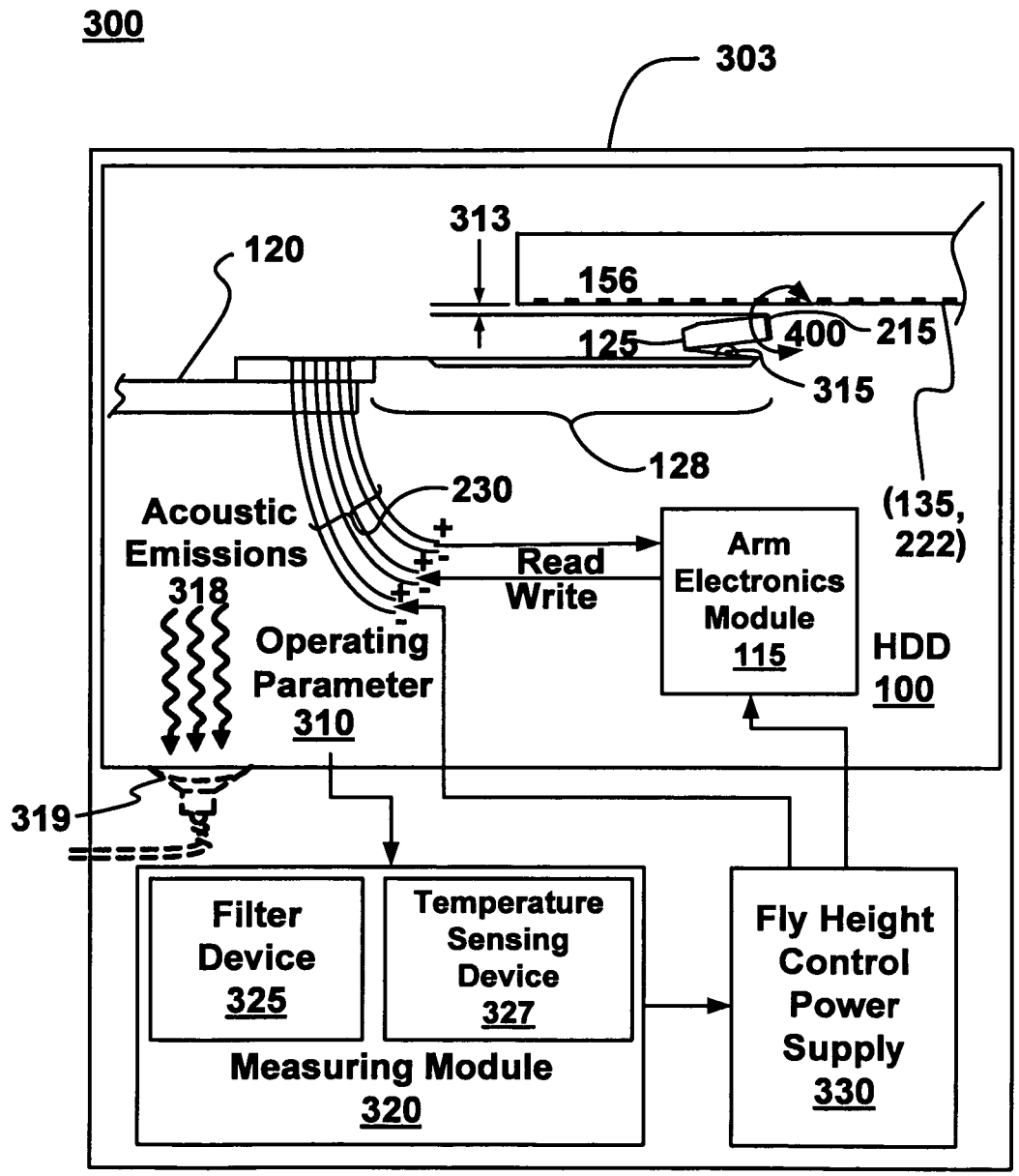
FIG. 3 is a block diagram of a system for improving magnetic performance of a magnetic transducer in accordance with one embodiment of the present invention.

With reference to FIG. 3, block diagram 300, which illustrates system 303 for improving magnetic performance of magnetic transducer 215 operating within HDD 100, is presented in accordance with one embodiment of the present invention. HDD 100 comprises HSA 120 which has at least one HGA 128. Slider 125 is coupled with magnetic transducer 215 and is flown adjacent to magnetic recording media 222 of disk 156 at a fly height 313 from magnetic recording media 222 and data track 135.

Figure 4:
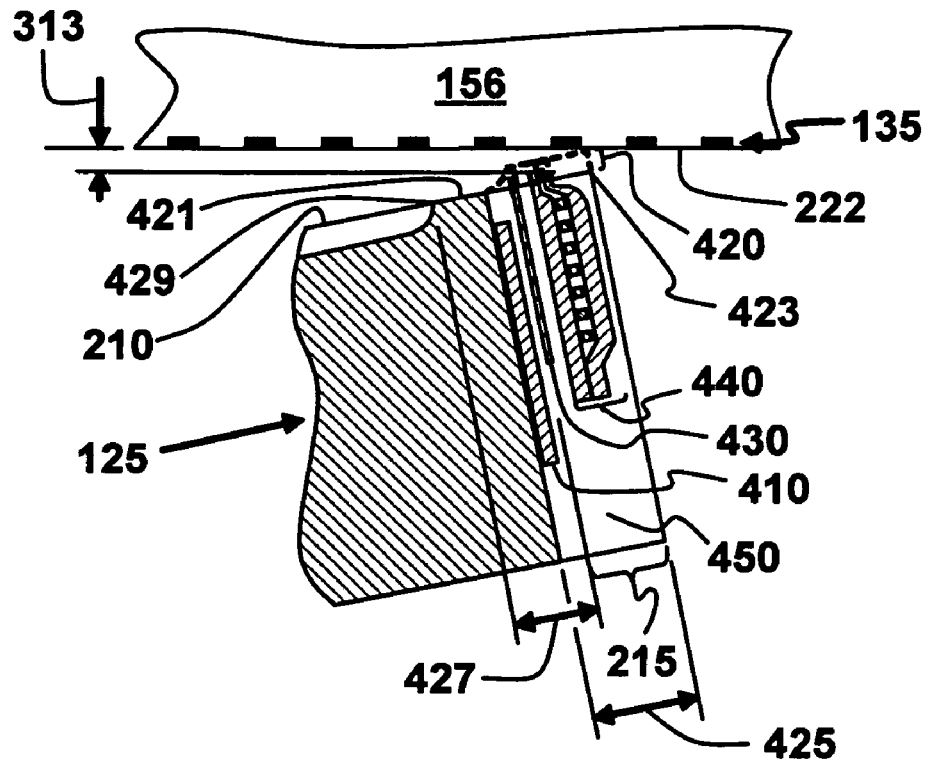
FIG. 4 is a side view detail of a slider and a disk in accordance with one embodiment of the present invention.

With reference to FIG. 4, side view detail 400 of slider 125 and disk 156 is presented in accordance with one embodiment of the present invention. Magnetic transducer 215 is coupled with ABS 210 and fly height control device 410. ABS 210 can be characterized by its ability to dampen mechanical vibration. Damping is well understood in the art. In brief, damping is the inherent characteristic of a structure to attenuate vibration. In accordance with an embodiment of the present invention, ABS 210 is highly damped. The damping characteristics of ABSs shipped in today's hard disk drives are typically less than 1% of critical damping for the pitch 2 mode vibration at about 250 kHz. A highly damped ABS is greater than 3% of critical damping for the pitch 2 mode vibration. Roll mode and pitch 1 mode vibrations have less effect on slider flying height modulation than the slider pitch 2 mode vibration.

With continued reference to side view detail 400 of FIG. 4, and in accordance with an embodiment of the present invention, magnetic transducer 215 is coupled with a fly height control device. Some examples of fly height control devices which are operable to embodiments of the present invention are: a PZT coupled with a suspension to deflect the suspension and urge the magnetic transducer closer to or farther from the magnetic recording media; a shape memory alloy, also known as SMA and NITINOL, coupled with a suspension to deflect the suspension and urge the magnetic transducer closer to or farther from the magnetic recording media; a PZT coupled with a slider to deflect the slider and urge the magnetic transducer closer to or farther from the magnetic recording media; and a thermal fly height control (TFC) coupled with a magnetic transducer to urge the magnetic transducer closer to the magnetic recording media. In accordance with an embodiment of the present invention, a fly height control device comprises thermal fly height control (TFC) device 410.

With continued reference to FIG. 3, and in accordance with an embodiment of the present invention, block diagram 300 of system 303 for improving magnetic performance of magnetic transducer 215 operating within HDD 100 comprises measuring module 320, wherein at least one operating parameter 310 associated with HDD 100 is measured. In one embodiment operating parameter 310 is amplitude of a read-back signal from data track 135 read by magnetic transducer 215. In accordance with an embodiment of the present invention, measuring module 320 comprises filter device 325. Filter device 325 measures the amplitude of a read-back signal from data track 135 read by magnetic transducer 215. Examples of filter device 325 are: an all-pass filter, a lead-lag filter, a notch filter, a band-pass filter, a high-pass filter, a peak filter, and a low-pass filter.

In accordance with another embodiment of the present invention, operating parameter 310 is temperature, and measuring module 320 comprises temperature sensing device 327. Temperature sensing device 327 measures temperature inside HDD 100.

In accordance with an embodiment of the present invention, fly height control power supply 330 is coupled with measuring module 320. Fly height control power supply 330 activates the fly height control device to move magnetic transducer 215 into contact with magnetic recording media 222. Fly height control power supply 330 activates the fly height control device in accordance with the measurement of operating parameter 310 made by measuring module 320.

In accordance with an embodiment of the present invention, A/E module 115, which operates magnetic transducer 215, is coupled with fly height control power supply 330. Fly height control power supply transmits a command to A/E module 115 to operate magnetic transducer 215 upon receiving a measurement of operating parameter 310 from measuring module 320. Operating parameter 310, such as temperature and read-back signal amplitude can degrade the magnetic performance of a magnetic transducer 215. Embodiments of the present invention improve the magnetic performance of magnetic transducer 215 by activating magnetic transducer 215 while magnetic transducer 215 is in contact with magnetic recording media 222. The Wallace equation presents that at the extreme condition of the magnetic transducer sliding in contact with the magnetic recording media, the maximum amount of data for a given magnetic transducer and magnetic recording media combination is achieved.

Activation of magnetic transducer 215 can be a read function whereby a read-back signal is read from data track 135 by magnetic transducer 215. Activation of magnetic transducer 215 can be a write function whereby data track 135 is written on magnetic recording media 222 by magnetic transducer 215.

Operation

Embodiments of the present invention enable the selective improvement of any number of magnetic transducers in an HSA whose operating parameter of read-back signal amplitude is too low. Selective improvement of low read-back signal improves the yield of an HSA. For example, under commonly practiced manufacturing procedure, if one magnetic transducer in an HSA does not have the expected read-back signal amplitude, the HSA is reworked by replacing the one underperforming magnetic transducer.

With reference to elements in FIG. 1 and FIG. 2, the rework procedure, which is well known in the art, comprises unsoldering soldering pads 235 on HGA 128 from flex cable 110; de-swaging swage spud 237 from HSA 120 and removing the underperforming HGA 128. The rework process exposes other components, such as good HGAs to collateral damage. Embodiments of the present invention enable the underperforming magnetic transducer 215 to be put in contact with magnetic recording media 222, thereby maximizing the magnetic performance of an underperforming HGA 128 and avoiding rework and possible damage of HSA 120.

The read-back signal from magnetic transducer 215 is an indication that either magnetic transducer 215 is not able to read data track 135 with sufficient amplitude, or to write data track 135 with sufficient amplitude. Insufficient amplitude of a written or read data track 135 can be caused by conditions such as instability of magnetic material comprising magnetic transducer 215, interaction of tolerances of features comprising ABS 210 and tolerances of HSA 120, fabrication and/or assembly tolerances of HGA 128 and HSA 120, atmospheric pressure, and temperature of HDD 100. In accordance with embodiments of the present invention, once insufficient amplitude is identified, magnetic transducer 215 is placed into contact with magnetic recording media 222 during the activation of magnetic transducer 215. Activation of magnetic transducer 215 comprises reading and/or writing data track 135.

Data track 135 can comprise servo data. Upon reading insufficient amplitude from servo data written on data track 135, for example during the servo-write process, magnetic transducer 215 associated with the insufficient amplitude can be identified and designated to read data track 135 while in contact with magnetic recording media 222, and/or write data track 135, including re-writing servo data, while in contact with magnetic recording media 222.

It is possible to have the temperature of HDD 100 too low such that the coercivity of magnetic recording media 222 is too high to allow the magnetic domains of magnetic recoding media 222 to be changed by magnetic transducer 215 to allow writing of data track 135. In accordance with an embodiment of the present invention, during conditions of the operating parameter of temperature being too low inside HDD 100, magnetic transducer 215 is brought into contact by a fly height control device, such as thermal fly height control device 410. In so doing, the contact of magnetic transducer 215 with magnetic recording media 222 results in frictional heating which raises the temperature which lowers the coercivity of magnetic recording media 222. The frictional heating allows the magnetic domains of magnetic recoding media 222 to be changed by magnetic transducer 215 thus allowing writing of data track 135.

Typically bringing a slider and magnetic transducer into contact with a magnetic recording media causes bouncing and vibration of the magnetic transducer coupled with the slider. This bouncing and vibration reduces the benefit of activating the magnetic transducer while it is in contact with the magnetic recording media. The bouncing and vibration results in fluctuations in the spacing of the magnetic transducer to the magnetic recording media. It can be appreciated from the Wallace spacing equation that variations in fly height are detrimental to the read-back signal amplitude and areal density of data that can be written to and read from a magnetic recording media.

Figure 5:
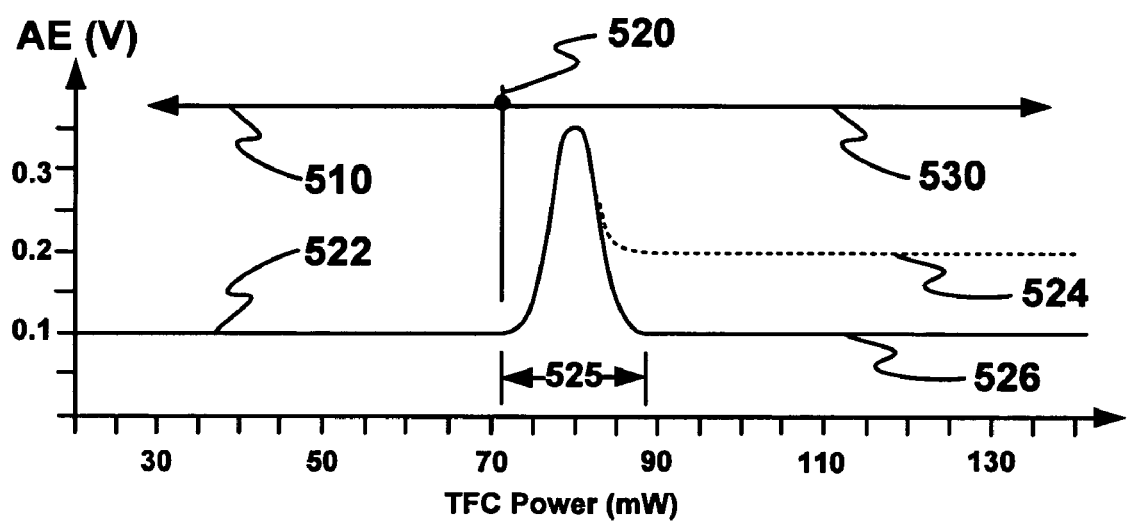
FIG. 5 is a plot of acoustic emissions (AE) verses thermal fly height control (TFC) power in accordance with one embodiment of the present invention.

With reference to FIG. 5, plot 500 of acoustic emissions (AE) versus thermal fly height control (TFC) power is presented in accordance with one embodiment of the present invention. The art of analyzing acoustic emissions is well known in the art of hard disk drives. With reference to FIG. 3, block diagram 300 of system 303 presents acoustic emissions 318 generated by vibrations inside HDD 100. Acoustic emission (AE) detector 319 receives acoustic emissions 318 and transmits a signal, typically in volts, to a device for analysis outside HDD 100.

Plot 500 presents an analysis of acoustic emissions in accordance with an embodiment of the present invention. Region 510 to the left of contact point 520 is a region wherein no contact occurs between slider 125 and magnetic recording media 222. The amplitude of AE signal 522 in region 510 comprises acoustic emissions from components in HDD 100 and background noise from AE detector 319. At contact point 520, contact is made between slider 125 and magnetic recording media 222. In accordance with an embodiment of the present invention, contact is made by providing power to TFC device 410 which results in protrusion 420. Protrusion 420 comprises magnetic transducer 215. Protrusion 420 increases until fly height 313 is reduced to zero resulting in contact between magnetic transducer 215 and magnetic recording media 222.

Region 530 of plot 500, to the right of contact point 520 is a region wherein contact occurs between protrusion 420 (which comprises magnetic transducer 215) and magnetic recording media 222. A region of instability in the amplitude of the AE signal is denoted by instability region 525. Instability region 525 is caused by acoustic emissions from slider 125 bouncing and vibrating against magnetic recording media 222 as TFC power is increased.

An ABS that is not highly damped, i.e. an ABS in which its percent of critical damping is less than 3%, will typically exhibit an acoustic emission curve that follows AE signal 524. Once instability region 525 has passed, AE signal 524 indicates that slider 125 of a non-highly damped ABS is stable but vibrating and interacting with magnetic recording media 222 in a manner that is more aggressive and generating more energetic acoustic emissions than AE signal 522. It has been observed through experimentation that a non-highly damped ABS characterized with an AE signal 524 experiences more lubricant pick-up from magnetic recording media 222, than a highly damped ABS characterized with an AE signal 526. Excess lubricant pick-up can lead to changes in the flying characteristics of slider 125 and possibly a catastrophic failure known as a head crash.

Such energetic interaction causes both magnetic and mechanical performance problems which are well known in the art. Examples of such problems are: Per the Wallace spacing equation, data written or read with a slider exhibiting acoustic emissions similar to AE signal 524 may experience modulation in its read-back signal amplitude. This can result in retries and increased latency in retrieving data. Energetic interaction may result in mechanical wear of the magnetic transducer and/or the magnetic recording media. Severe wear can result in loss of data and/or a head crash. Problems with energetic interaction of the magnetic transducer with the magnetic recording media are well understood in the art, and the examples presented are not intended to be an exhaust or extensive list of problems. This short list of examples is presented for the sake of illustration.

In accordance with an embodiment of the present invention, coupling a magnetic transducer with a highly damped ABS, i.e. an ABS with a percent critical damping greater than 3%, and contacting the magnetic transducer with a magnetic recording media by means of a fly height control device, such as a thermal fly height control device, enables the magnetic transducer to slide in contact with the magnetic recording media without energetic interaction between the magnetic transducer and the magnetic recording media. This is evidenced by AE signal 526. AE signal 526 is equal to and sometimes less than AE signal 522.

With continued reference to side view detail 400 of FIG. 4, and in accordance with another embodiment of the present invention, highly damped ABS 210 comprises pad 421. Pad 421 extends from trailing edge 423 of slider 125 to etched edge 429. Etched edge 429 is part of a feature comprising highly damped ABS 210. The small size of pad 421 minimizes the amount of electrostatic charge that can build up on highly damped ABS 210, which can lead to electrostatic attraction of slider 125 to magnetic recording media 222. The small size of pad 421 is defined by etched edge 429 being apart from magnetic transducer 215 a distance 427 that is at most equivalent to the thickness 425 of deposition 450. Deposition 450 couples magnetic transducer 215 to slider 125.

Figure 6:
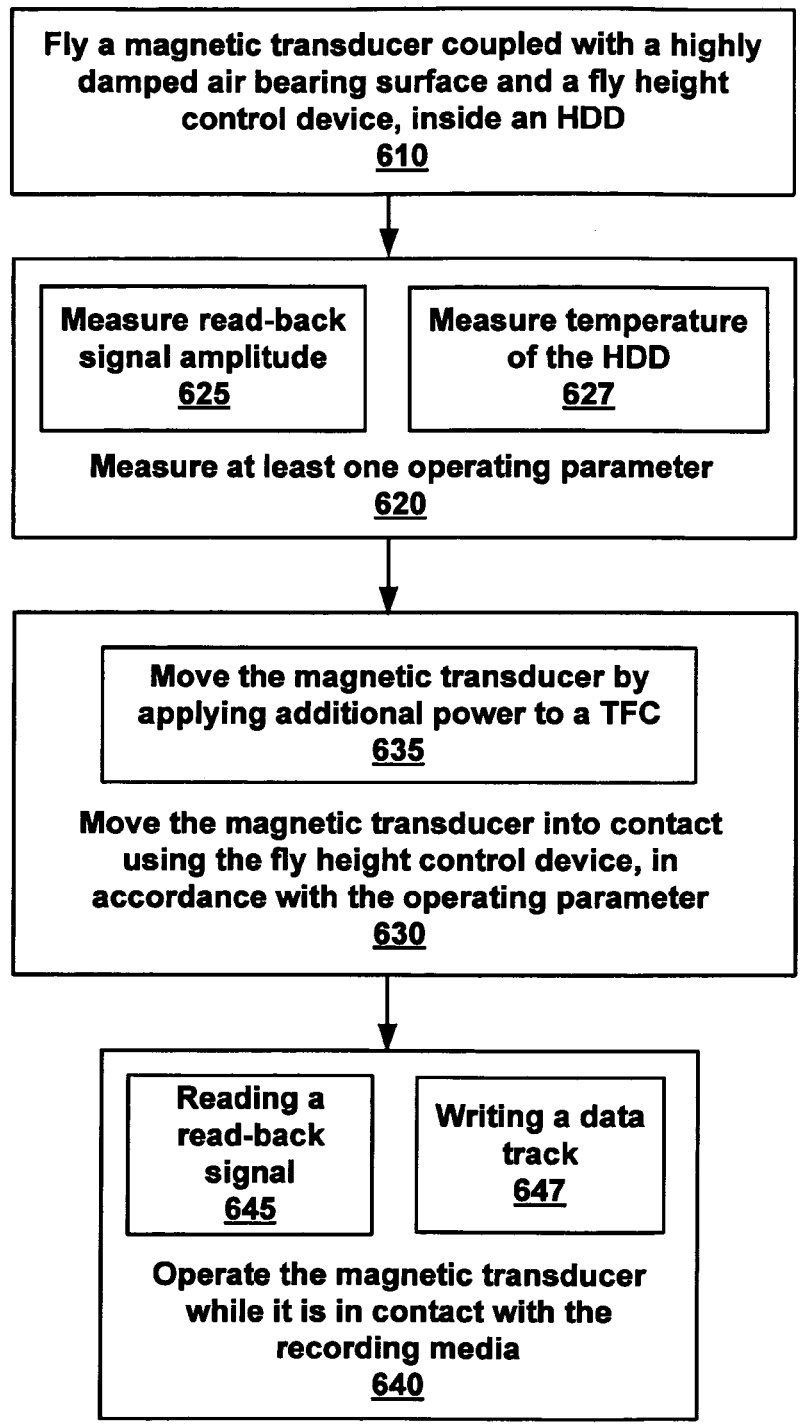
FIG. 6 is a flow chart illustrating a process for improving magnetic performance of a magnetic transducer in accordance with one embodiment of the present invention.

FIG. 6 is a flow chart illustrating process 600 for improving magnetic performance of a magnetic transducer, in accordance with an embodiment of the present invention. In accordance with an embodiment of the present invention, process 600 for improving magnetic performance of a magnetic transducer is performed on all magnetic transducers within an HDD. In accordance with an embodiment of the present invention process 600 is performed on at least one magnetic transducer within an HDD. In accordance with an embodiment of the present invention, process 600 is performed during servo-write for the benefit of enhancing the reliability of the HDD. An example of this benefit is to place at least one magnetic transducer, which is experiencing poor magnetic performance, in contact with a corresponding magnetic recording media, and thusly write servo data with the largest amplitude possible and with the least modulation. By having optimized servo data, a customer's data is located faster due to fewer attempts at reading the servo data and thusly enhances the reliability of the servo system and the HDD.

In one embodiment, process 600 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. Although specific components are disclosed in process 600, such components are examples of components for carrying out process 600. That is, the embodiments of the present invention are well suited to performing various other components or variations of the components recited in FIG. 6. Within the present embodiment, it should be appreciated that the components of process 600 may be performed by software, by hardware, by an assembly mechanism, through human interaction, or by any combination of software, hardware, assembly mechanism, and human interaction.

Process 600 will be described with reference to elements shown in FIG. 1, FIG. 2, FIG. 4, and FIG. 5.

In one embodiment, as shown at 610 of process 600, magnetic transducer 215 is flown at a distance of separation (fly height 313) from magnetic recording media 222. In accordance with an embodiment of the present invention, magnetic transducer 225 is coupled with highly damped ABS 210 and a thermal fly height control (TFC) device 410.

It should be appreciated that TFC device 410 is one of several devices operable for controlling fly height 313 that can be coupled with magnetic transducer 215 and highly damped ABS 210 in accordance with embodiments of the present invention. Some examples of devices for controlling fly height include, but are not limited to: a PZT coupled with a suspension to deflect the suspension and urge the magnetic transducer in contact with the magnetic recording media; a shape memory alloy, also known as SMA and NITINOL, coupled with a suspension to deflect the suspension and urge the magnetic transducer in contact with the magnetic recording media; and a PZT coupled with a slider to deflect the slider and urge the magnetic transducer in contact with the magnetic recording media.

In accordance with an embodiment of the present invention, flying highly damped ABS 210 comprises flying highly damped ABS 210 having pad 421. Pad 421 extends from trailing edge 423 of slider 125 to etched edge 429. Etched edge 429 is part of a feature comprising highly damped ABS 210. The small size of pad 421 minimizes electrostatic charge that can build up on highly damped ABS 210, which can lead to electrostatic attraction of slider 125 to magnetic recording media 222 and increased reaction force on magnetic transducer 215. The small size of pad 421 is defined by etched edge 429 being apart from magnetic transducer 215 a distance 427 that is at most equivalent to the thickness 425 of deposition 450. Deposition 450 couples magnetic transducer 215 to slider 125.

In one embodiment, as shown at 620 of process 600, an operating parameter associated with HDD 100 is measured. In accordance with another embodiment of the present invention, an operating parameter associated with HDD 100 is amplitude of a read-back signal from data track 135 read by magnetic transducer 215. In accordance with another embodiment of the present invention, an operating parameter associated with HDD 100 is temperature inside HDD 100.

In one embodiment, as shown at 625 of process 600, measuring an operating parameter associated with HDD 100 comprises measuring read-back signal amplitude from magnetic recording media 222 read with magnetic transducer 215. Examples of a device for measuring read-back signal amplitude comprise an all-pass filter, a lead-lag filter, a notch filter, a band-pass filter, a high-pass filter, a peak filter, and a low-pass filter.

In one embodiment, as shown at 627 of process 600, measuring an operating parameter associated with HDD 100 comprises measuring a temperature inside HDD 100. Examples of methods for measuring the temperature inside HDD 100 are: measuring the resistance of magneto-restive read element 430 which is part of magnetic transducer 215; measuring the resistance change of a thermistor coupled with HDD 100; and the like. Temperature measuring methods are well known in the art. The list of examples for measuring the temperature inside HDD 100 is not intended to be an exhaustive list of temperature measuring methods and is presented for the sake of brevity and clarity.

In one embodiment, as shown at 630 of process 600, magnetic transducer 215 is moved into contact with magnetic recording media 222 by using a fly height control device, in accordance with at least one operating parameter associated with HDD 100. With reference to FIG. 5, it is beneficial to the mechanical and magnetic performance of magnetic transducer 215 to transition quickly from region 510, wherein slider 125 is flying, to region 530, wherein slider 125 is in contact with magnetic recording media 222. Transitioning quickly from region 510 to region 530 minimizes instability region 525. During instability region 525, data track 135 cannot be read or written reliably. During instability region 525, magnetic transducer 215 is exposed to being damaged by the energetic interaction between magnetic transducer 215 and magnetic recording media 222.

In one embodiment, element 630 of process 600 further comprises 635, moving magnetic transducer 215 into contact with a fly height control device comprises applying additional power to TFC device 410. TFC device 410 can be operated to maintain a constant fly height 313. There is an associated power delivered to TFC device 410 to maintain a constant fly height 313. Additional power beyond that power for maintaining a constant fly height 313 is required to bring magnetic transducer 215 into contact with magnetic recording media 222.

In accordance with an embodiment of the present invention, additional power which is applied to TFC device 410 to cause magnetic transducer 215 to contact magnetic recording media 222 is less than 20 milliwatts (mW). By having the additional power less than 20 mW, protrusion 420 grows less than 2 nanometers (nm) to transition from flying separately from magnetic recording media 222 to contacting magnetic recording media 222. The 2 nm protrusion in part results in low contact force between magnetic transducer 215 and magnetic recording media 222 and hence results in low wear.

With reference to elements in FIG. 3, another factor that contributes to low contact force and low wear of magnetic transducer 215 and/or magnetic recording media 222, is the location of pivot 315. Pivot 315 is a feature of HGA 128 which allows slider 125 to pitch and roll about a single point. By locating pivot 315 further from trailing edge 423 the forces that result from a pitch moment about pivot 315 and frictional drag of pad 421 sliding on magnetic recording media 222 are reduced.

The small size of pad 421 minimizes the amount of electrostatic charge that can build up on highly damped ABS 210, which can lead to electrostatic attraction of slider 125 to magnetic recording media 222. The small size of pad 421 and the associated minimal amount of electrostatic charge reduces the contact force between magnetic transducer 215 and magnetic recording media 222.

In one embodiment, as shown at 640 of process 600, magnetic transducer 215 is operated while it is in contact with magnetic recording media 222. The operations of magnetic transducer 215 include reading of data track 135 and writing data track 135. The reading operation of magnetic transducer 215 is accomplished in part by magneto-restive read element 430. The writing operation of magnetic transducer 215 is accomplished in part by inductive write element 440.

In one embodiment, element 640 of process 600 further comprises 645, reading a read-back signal from magnetic recording media 222 with said magnetic transducer 215, while magnetic transducer 215 is in contact with magnetic recording media 222.

In one embodiment, element 640 of process 600 further comprises 647, writing data track 135 onto magnetic recording media 222 with magnetic transducer 215, while magnetic transducer 215 is in contact with magnetic recording media 222.

The present invention, in the various presented embodiments improves the reliability and performance of an HDD, and the manufacturing yield of an HDD. Embodiments of the present invention enable selective contacting of a marginally performing magnetic transducer with an adjacent magnetic recording media such that reading and/or writing of a data track is made possible, without incurring the typically occurring problems of contact recording. Problems that can be avoided with the benefits of the embodiments of the present invention are: wear of the magnetic transducer and/or magnetic recording media; excess lubricant pick-up and unstable flying; debris generation; and head crash. Without the benefits of the embodiments of the present invention, a marginally performing magnetic transducer would require a rework process, which can damage otherwise good components.

Embodiments of the present invention enable the recording of data on magnetic recording media that could otherwise be too cold which can cause the coercivity of the magnetic recording media to be too high to allow writing of data on the magnetic recording media. Embodiments of the present invention enable an HDD's magnetic transducers to contact adjacent magnetic recording media and warm the magnetic recording media with frictional heating. Frictional heating decreases the coercivity of the magnetic recording media, thereby allowing data on the magnetic recording media to be written. Embodiments of the present invention enable switching back and forth between flying and contacting state. The contacting state is a non-bouncing state with minimal or no wear (head burnishing) over the lifetime of the drive. Contact is selected only when necessary, i.e. for read or write operations for the selected head.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for improving magnetic performance of at least one magnetic transducer operating within a hard disk drive, said method comprising:

flying said magnetic transducer at a distance of separation from a magnetic recording media, wherein said magnetic transducer is coupled with a highly damped air bearing surface and a fly height control device;

measuring at least one operating parameter associated with said hard disk drive;

moving said magnetic transducer into contact with said magnetic recording media by using said fly height control device, in accordance with at least one said operating parameter associated with said hard disk drive; and operating said magnetic transducer while said magnetic transducer is in contact with said magnetic recording media, thereby improving the magnetic performance of said magnetic transducer.

2. The method of claim 1, wherein said flying said magnetic transducer, coupled with said highly damped air bearing surface, comprises:

flying said highly damped air bearing surface having a pad which includes said magnetic transducer, wherein said pad has at least one etched edge that is apart from said magnetic transducer at a distance equivalent at most to the thickness of a deposition containing said magnetic transducer.

3. The method of claim 1, wherein said measuring an operating parameter associated with said hard disk drive comprises:

measuring a read-back signal amplitude from said magnetic recording media.

4. The method of claim 1, wherein said measuring an operating parameter associated with said hard disk drive comprises:

measuring a temperature of said hard disk drive.

5. The method of claim 1, wherein said moving said magnetic transducer into contact using said fly height control device comprises:

applying additional power to a thermal fly height control device.

6. The method of claim 5, wherein said moving said magnetic transducer with said thermal fly height control device comprises:

applying said additional power to said thermal fly height control device wherein said additional power, which causes said contact of said magnetic transducer with said magnetic recording media, is less than 20 milliwatts.

7. The method of claim 1, wherein said operating said magnetic transducer while said magnetic transducer is in contact with said magnetic recording media comprises:

reading a read-back signal from said magnetic recording media with said magnetic transducer.

8. The method of claim 1, wherein said operating said magnetic transducer while said magnetic transducer is in contact with said magnetic recording media comprises:

writing a data track onto said magnetic recording media with said magnetic transducer.

9. A system for improving magnetic performance of a magnetic transducer operating within a hard disk drive said system comprising:

a head stack assembly for flying said magnetic transducer at a distance of separation from a magnetic recording media, wherein said magnetic transducer is coupled with a highly damped air bearing surface and a fly height control device;

a measuring module for measuring at least one operating parameter associated with said hard disk drive;

a power supply coupled with said measuring module, whereby said power supply activates said fly height control device to move said magnetic transducer into contact with said magnetic recording media, in accordance with said operating parameter measured by said measuring module; and an arm electronics module for operating said magnetic transducer while said magnetic transducer is in contact with said magnetic recording media, thereby improving the magnetic performance of said magnetic transducer.

10. The system of claim 9, wherein said measuring module for measuring one operating parameter of said hard disk drive comprising:
a filter device for measuring a read-back signal amplitude from said magnetic recording media read with said magnetic transducer.

11. The system of claim 9, wherein said measuring module for measuring one operating parameter of said hard disk drive comprising:
a temperature sensing device for measuring a temperature inside said hard disk drive.

12. The system of claim 9, wherein said fly height control device comprises a thermal fly height control device.

13. A computer-readable memory containing executable instructions, wherein
said instructions when executed effect a method for improving magnetic performance of at least one magnetic transducer operating within a hard disk drive, said method comprising:
flying said magnetic transducer at a distance of separation from a magnetic recording media, wherein said magnetic transducer is coupled with a highly damped air bearing surface and a fly height control device;
measuring at least one operating parameter associated with said hard disk drive;
moving said magnetic transducer into contact with said magnetic recording media by using said fly height control device, in accordance with at least one said operating parameter of said hard disk drive; and
operating said magnetic transducer while said magnetic transducer is in contact with said magnetic recording media, thereby improving the magnetic performance of said magnetic transducer.

14. The computer-readable memory as described in claim 13, wherein said flying said magnetic transducer, coupled with said highly damped air bearing surface, comprises:
flying said highly damped air bearing surface having a pad which includes said magnetic transducer, wherein said pad has at least one etched edge that is apart from said magnetic transducer at a distance equivalent at most to the thickness of a deposition containing said magnetic transducer.

15. The computer-readable memory as described in claim 13, wherein said measuring an operating parameter associated with said hard disk drive comprises:
measuring a read-back signal amplitude from said magnetic recording media.

16. The computer-readable memory as described in claim 13, wherein said measuring an operating parameter associated with said hard disk drive comprises:
measuring a temperature of said hard disk drive.

17. The computer-readable memory as described in claim 13, wherein said moving said magnetic transducer using said fly height control device comprises:
applying additional power to a thermal fly height control device.

18. The computer-readable memory as described in claim 17, wherein said moving said magnetic transducer with said thermal fly height control device comprises:
applying said additional power to said thermal fly height control device wherein said additional power, which causes said contact of said magnetic transducer with said magnetic recording media, is less than 20 milliwatts.

19. The computer-readable memory as described in claim 13, wherein said operating said magnetic transducer while said magnetic transducer is in contact with said magnetic recording media comprises:
reading a read-back signal from said magnetic recording media with said magnetic transducer.

20. The computer-readable memory as described in claim 13, wherein said operating said magnetic transducer while said magnetic transducer is in contact with said magnetic recording media comprises:
writing a data track onto said magnetic recording media with said magnetic transducer.

* * * * *